United States Patent
Zhang et al.

(10) Patent No.: US 11,620,846 B2
(45) Date of Patent: Apr. 4, 2023

(54) DATA PROCESSING METHOD FOR MULTI-SENSOR FUSION, POSITIONING APPARATUS AND VIRTUAL REALITY DEVICE

(71) Applicant: NOLO CO., LTD., Beijing (CN)

(72) Inventors: Yiming Zhang, Beijing (CN); Daoning Zhang, Beijing (CN); Jianing Zhang, Beijing (CN)

(73) Assignee: NOLO CO., LTD., Beijing (CN)

( * ) Notice: Subject to any disclaimer, the term of this patent is extended or adjusted under 35 U.S.C. 154(b) by 291 days.

(21) Appl. No.: 17/136,846

(22) Filed: Dec. 29, 2020

(65) Prior Publication Data

US 2021/0201011 A1    Jul. 1, 2021

(30) Foreign Application Priority Data

Dec. 31, 2019 (CN) .......................... 201911405726.2

(51) Int. Cl.
*G06V 40/10* (2022.01)

(52) U.S. Cl.
CPC ................................ *G06V 40/103* (2022.01)

(58) Field of Classification Search
CPC ...... G06V 40/103; G06V 10/80; G06V 20/20; G06K 9/6288; G06F 3/011; G06F 3/0346; G06F 3/0383
See application file for complete search history.

(56) References Cited

U.S. PATENT DOCUMENTS

| | | | |
|---|---|---|---|
| 9,304,003 B1* | 4/2016 | Ashman | G01C 21/206 |
| 10,416,760 B2* | 9/2019 | Burns | H04N 9/31 |
| 2018/0365898 A1* | 12/2018 | Costa | G02B 27/0172 |
| 2019/0113347 A1* | 4/2019 | Kim | G01C 21/1652 |
| 2021/0201011 A1* | 7/2021 | Zhang | G06V 20/20 |

* cited by examiner

*Primary Examiner* — Md K Talukder
(74) *Attorney, Agent, or Firm* — George McGuire

(57) ABSTRACT

Provided are a data processing method for multi-sensor fusion, a positioning apparatus and a VR device. The method includes: calculating a pose of a physical center by using data of at least one sensor set in a first positioning period; obtaining the predicted pose of the physical center according to an inertial navigation of the pose of the physical center; calculating a three-dimensional coordinate pose of each sensor set in a second positioning period; calculating, based on the three-dimensional coordinate pose, third inertial navigation data of each sensor set in the second positioning period; obtaining the converted poses of the physical center respectively through the third inertial navigation data and a pose relationship between each sensor and the physical center; and obtaining the predicted pose of each sensor set based on the converted poses of the physical center.

20 Claims, 2 Drawing Sheets

DATA PROCESSING METHOD FOR MULTI-SENSOR FUSION, POSITIONING APPARATUS AND VIRTUAL REALITY DEVICE

CROSS-REFERENCE TO RELATED APPLICATION

This application claims priority to Chinese Patent Application No. 201911405726.2 filed Dec. 31, 2019, the disclosure of which is incorporated herein by reference in its entirety.

TECHNICAL FIELD

The present disclosure relates to a data processing method for multi-sensor fusion, a positioning apparatus and a virtual reality (VR) device, which belong to the technical field of VR.

BACKGROUND

Indoor positioning technologies in the related art include electromagnetic positioning, WiFi positioning, ultrasonic positioning, inertial navigation positioning and the like. The inertial navigation technology is mainly applied to the position and posture measurement of a VR positioning device. The inertial navigation technology is to perform data fusion on external positioning data (such as vision simultaneous localization and mapping (SLAM), lighthouse, etc.) and accelerated velocity and angular velocity data, measured by an inertial measurement unit (IMU, which is an inertial device), of a carrier relative to an inertial space, thereby providing high update frequency positions and postures. The inertial device includes an accelerometer and a gyroscope, the accelerometer outputs an absolute accelerated velocity of the carrier and the gyroscope outputs an angular velocity or an angular increment of the carrier relative to the inertial space. The accelerated velocity and the angular velocity contain all information of the carrier, so the inertial navigation system can obtain all information for navigation just by the inertial device of the system.

However, the existing inertial navigation system also has limitations that the system requires a large number of sensors and the sensors to cover various angles, or requires performing the visual analysis through a computing unit having higher processing performance. However, in practical application scenarios, there are great limitations on the size, power consumption and cost of the positioner such that it is necessary to use the least number of sensors and a relatively cheap processor having poor performance to implement the inertial navigation and positioning.

SUMMARY

The present disclosure provides a data processing method for multi-sensor fusion, a positioning apparatus, a VR device.

The present disclosure provides the technical schemes described below.

In a first aspect of an embodiment of the present disclosure, a data processing method for multi-sensor fusion is provided. The method includes steps described below.

A pose calculation step: a pose of a physical center is calculated by using data of at least one sensor set in a first positioning period.

A step of obtaining a predicted pose of the physical center: the predicted pose of the physical center is obtained according to an inertial navigation of the pose of the physical center.

A step of obtaining a three-dimensional coordinate in a second positioning period: a three-dimensional coordinate pose of each sensor set is calculated in the second positioning period.

A step of calculating third inertial navigation data: based on the three-dimensional coordinate pose of each sensor set, third inertial navigation data of each sensor set in the second positioning period is calculated.

A step of calculating converted poses of the physical center: the converted poses of the physical center are obtained respectively through the third inertial navigation data of each sensor set and a pose relationship between each sensor and the physical center.

A step of obtaining a predicted pose of each sensor set: the predicted pose of each sensor set is obtained based on the converted poses of the physical center.

In an embodiment, the pose calculation step includes steps described below.

Step 1: an inertial navigation is performed by using the data of the at least one sensor set which has obtained a three-dimensional coordinate, to obtain first inertial navigation data.

Step 2: the pose of the physical center is derived by using the first inertial navigation data.

Step 3: a pose of a sensor set not obtaining a three-dimensional coordinate is calculated by using the derived pose of the physical center.

In an embodiment, the method further includes the following steps: the predicted pose of the physical center obtained in the step of obtaining the predicted pose of the physical center is compared with each of the converted poses of the physical center obtained in the step of calculating the converted poses of the physical center, and one of the converted poses of the physical center, which has a minimum error with the predicted pose of the physical center is selected as a pose of the physical center in a step of obtaining a predicted pose of the physical center in a next positioning period.

In an embodiment, the method further includes the following steps: poses of the remaining sensor sets are derived based on the one of the converted poses of the physical center which has the minimum error with the predicted pose of the physical center, and the third inertial navigation data of each sensor set is corrected.

In an embodiment, each sensor set includes a laser sensor and an ultrasonic sensor.

The step of obtaining the three-dimensional coordinate in the second positioning period includes: calculating the three-dimensional coordinate pose of each sensor set by a polar coordinate manner; and the step of calculating the third inertial navigation data includes: performing an inertial navigation processing by using the three-dimensional coordinate pose of each sensor set calculated by the polar coordinate manner, so as to obtain the third inertial navigation data of each sensor set in the second positioning period.

In an embodiment, the three-dimensional coordinate pose of each sensor set calculated by the polar coordinate manner is the three-dimensional coordinate pose of each sensor set.

The third inertial navigation data is obtained by performing an inertial navigation separately based on the three-dimensional coordinate pose of each sensor set.

In an embodiment, the pose calculation step includes: calculating the pose of the physical center and a pose of a sensor set not obtaining a three-dimensional coordinate by using the data of the at least one sensor set which has obtained a three-dimensional coordinate.

In an embodiment, the step of calculating the third inertial navigation data includes: obtaining an accelerated velocity and an angular velocity of a position where an inertial device is located and provided by the inertial device, and obtaining accelerated velocities and angular velocities of the remaining sensor sets according to the accelerated velocity and the angular velocity of the position where the inertial device is located.

In a second aspect of an embodiment of the present disclosure, a positioning apparatus is provided. The positioning apparatus includes: a rigid body, a processor, a memory, and multiple sensor sets and an inertial device secured to the body.

The positioning apparatus has a physical center.

The processor is configured to read a computer program in the memory for executing the data processing method for multi-sensor fusion described above.

In a third aspect of an embodiment of the present disclosure, a VR device is provided. The VR device includes: a processor, a memory, a positioning apparatus and an imaging apparatus, where the positioning apparatus is mounted on a housing of a head-mounted display device. The processor is configured to read a computer program in the memory for executing the data processing method for multi-sensor fusion described above.

According to the present disclosure, the pose prediction of each sensor is performed by using the inertial navigation of each sensor set itself, so that the error caused by the laser sensor or the ultrasonic sensor may be reduced. Moreover, the inertial navigation data of the pose of the physical center which has a minimum error is used for ensuring the pose of the physical center to have the minimum error, and by using this result, the error of the inertial navigation of each sensor set is further corrected. Therefore, the accumulated error is reduced, and the deficiency of the IMU is overcome. In the present disclosure, the number of sensors is small and the calculation method is simple, so that the volume or the power consumption of the VR device in the present disclosure is not increased, and it is not necessary to select a high-performance processor, thus implementing the control of the cost.

DETAILED DESCRIPTION

The technical schemes of the present disclosure will be described in detail with reference to the drawings and specific embodiments.

In a data processing method for multi-sensor fusion provided by the embodiment of the present disclosure, as few sensors as possible is used, and thus the volume and the power consumption of the positioning apparatus is reduced; and by using a new calculation method, the calculation of the position and posture with a relatively lower calculation amount in a certain signal coverage range is implemented. Moreover, the positioning error is reduced through the iteration processing for the data received by the sensor. The present disclosure further provides a positioning apparatus and a VR device using the above data processing method.

Figure 1:
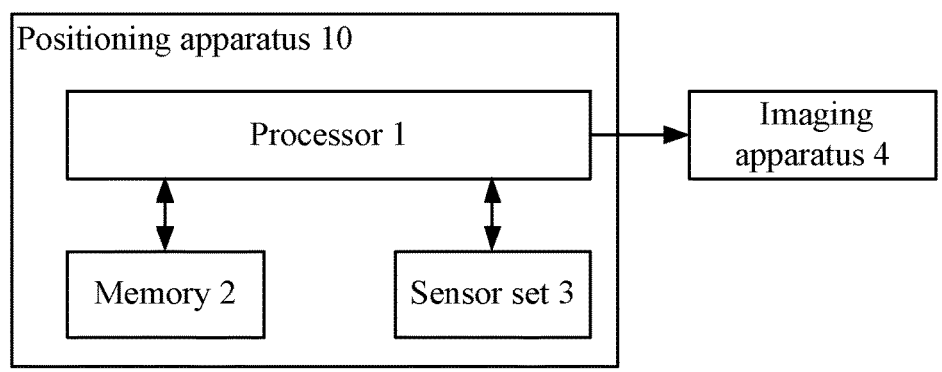
FIG. 1 is a structural diagram of a VR device according to the present disclosure.

As shown in FIG. 1, a VR device 100 provided by an embodiment of the present disclosure includes a positioning apparatus 10 and an imaging apparatus 4. The positioning apparatus 10 is mounted on a housing of a head-mounted display device (not shown in FIG. 1). The positioning apparatus 10 includes a rigid body (not shown in FIG. 1), a processor 1, a memory 2, and multiple sensor sets and an inertial device 3 secured to the body. The positioning apparatus 10 is used for detecting a pose change and sends the detected data to the processor 1. The memory 2 is configured to store the data processing method for multi-sensor fusion provided by the present disclosure. After the processor 1 calculates the detected data, the pose change of the positioning apparatus 10 is obtained. The positioning apparatus 10 is mounted on the head-mounted display device, and may perform data transmission with the head-mounted display device, so as to send the pose change of the positioning apparatus 10 to the VR device 100. Since the positioning apparatus 10 is mounted on the VR device 100, the pose change of the positioning apparatus 10 and the pose change of the VR device 100 should be synchronized. Therefore, the VR device 100 calculates new image display content according to the pose change, and then sends the new image display content to the imaging apparatus 4 for display.

Figure 2:
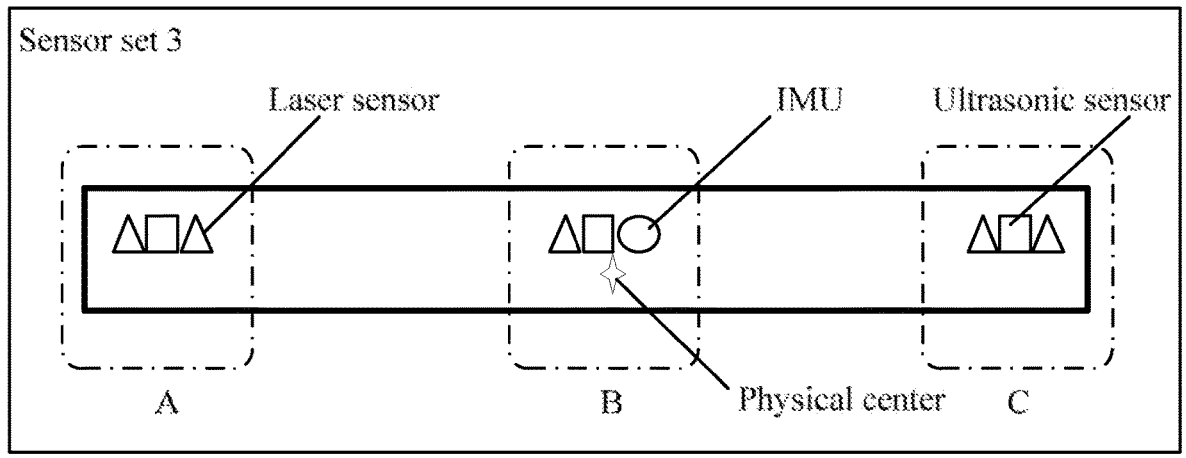
FIG. 2 is a schematic diagram of sensor sets of a positioning apparatus according to the present disclosure.

Positions of the sensor sets and the inertial device 3 are shown in FIG. 2. Each sensor set separately includes different sensors. A first sensor set (set A) on the left side of FIG. 2 includes two laser sensors and an ultrasonic sensor located in the middle of the laser sensors. A second sensor set (set B) located in the middle of FIG. 2 includes three sensors, where the three sensors are a laser sensor close to the first sensor set, an inertial measurement unit (IMU) close to a third sensor set and an ultrasonic sensor located in the middle of the laser sensor and the IMU. The positioning apparatus has a physical center, and the sensor set B is the sensor set closest to the physical center. In other words, the IMU is located in a position closest to the physical center. The processor is configured to read a computer program in the memory for executing the data processing method for multi-sensor fusion provided by the present disclose.

As shown in FIG. 1, the positioning apparatus 10 provided by the embodiment of the present disclosure includes the rigid body (not shown in FIG. 1), the processor 1, the memory 2, and the multiple sensors (sets) and the IMU inertial device 3 secured to the body. As shown in FIG. 2, each sensor set separately includes different sensors. The first sensor set (set A) on the left side of FIG. 2 includes two laser sensors (two laser sensors are shown in FIG. 2, and actually the number of the laser sensors may be one) and an ultrasonic sensor located in the middle of the laser sensors (the triangle represents the laser sensor, and the square represents the ultrasonic sensor). The second sensor set (set B) located in the middle of FIG. 2 includes three sensors, where the three sensors are the laser sensor close to the first sensor set, the IMU inertial device close to the third sensor set and the ultrasonic sensor located in the middle of the laser sensor and the IMU. The third sensor set (set C) located on the right side of FIG. 2 is similar to the first sensor set, including two laser sensors and an ultrasonic sensor located in the middle of the laser sensors. The number and arrangement of sensors shown in FIG. 2 are just examples and do not intend to limit the present disclosure. It can be seen that each of the multiple sensor sets disposed in the positioning apparatus of the present disclosure includes the laser sensor and the ultrasonic sensor, but only one of the sensor sets includes the IMU inertial component. It can also be understood by those skilled in the art that it is also feasible to arrange the IMU inertial component in each sensor set, but the cost, energy consumption and volume of the positioning apparatus may be increased. An IMU chip is used for measuring an accelerated velocity and an angular velocity of an object. In the positioning apparatus, the IMU may be disposed inside the positioning apparatus. In FIG. 2, the star represents the physical center (such as a center of gravity or an optical center) of the whole positioning apparatus (including a positioning apparatus body and the sensor sets).

Figure 3:
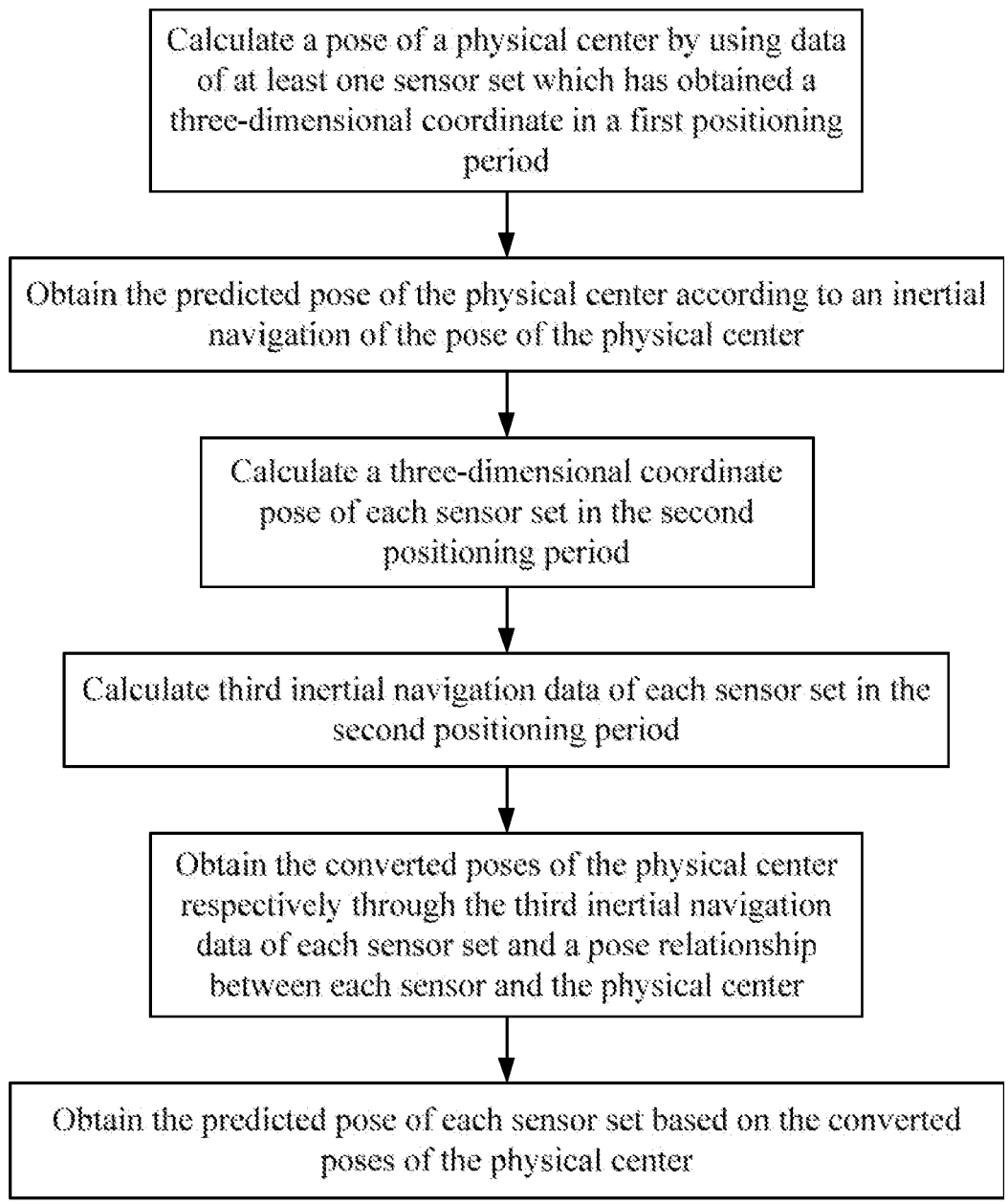
FIG. 3 is a flowchart of a data processing method for multi-sensor fusion according to the present disclosure.

In the positioning apparatus and the VR device provided by the embodiment of the present disclosure, the processor 1 is configured to read the computer program in the memory 2 for executing the data processing method for multi-sensor fusion provided by the present disclosure. As shown in FIG. 3, the data processing method includes the steps described below.

(1) A pose calculation step: a pose of a physical center is calculated by using data of at least one sensor set in a first positioning period.

In the first positioning period, the processor may calculate the pose of the physical center by using the data of at least one sensor set which has obtained a three-dimensional coordinate, and may also calculate a pose of a sensor set not obtaining a three-dimensional coordinate. Specific steps are as follows.

In step 1: an inertial navigation is performed by using data of one sensor set to obtain first inertial navigation data.

A three-dimensional coordinate pose of each of set A, set B and set C and a position of the physical center S of the positioning apparatus are known. Within a positioning period, one or two of the three sensor sets may not obtain three-dimensional coordinates due to blocking and other reasons, and then the inertial navigation is performed by using a sensor set which has obtained a three-dimensional coordinate to obtain the first inertial navigation data. (For example, only set C has obtains a three-dimensional coordinate C1, and first inertial navigation data C1' of set C is obtained after the inertial navigation is performed on C1). It can be understood by those skilled in the art that in the present disclosure, three-dimensional coordinate poses of the sensor sets may also be calculated one by one in sequence, or the three-dimensional coordinate pose of each sensor set may be calculated separately.

In step 2, the pose S1 of the physical center S is derived by using the first inertial navigation data.

The pose S1 of the physical center is obtained based on a pose relationship between the corresponding sensor and the physical center and according to the first inertial navigation data C1' of the sensor set C which has obtained the three-dimensional coordinate.

The pose of the physical center S may be obtained by performing a posture rotation according to the first inertial navigation data C1' and a position offset between the sensor set C and the physical center S.

In step 3, a pose of a sensor set not obtaining a three-dimensional coordinate is calculated by using the derived pose S1 of the physical center S.

The inertial navigation processing is performed on the pose S1 of the physical center to obtain second inertial navigation data S1'. By the second inertial navigation data S1' and a position relationship between the physical center S and the sensor set AB (a position relationship of the rigid body is relatively fixed), pose A1 of the sensor set A not obtaining the three-dimensional coordinate and pose B1 of the sensor set B not obtaining the three-dimensional coordinate are derived.

(2) A step of obtaining a predicted pose of the physical center: the predicted pose of the physical center S2 is obtained according to the second inertial navigation data S1' of the pose S1 of the physical center.

(3). A step of obtaining a three-dimensional coordinate in a second positioning period: a three-dimensional coordinate pose of each sensor set in the second positioning period is calculated by a polar coordinate manner.

In the second positioning period, the three-dimensional coordinate of each of the three sensor sets relative to a base station is obtained by each of the sensor sets A, B and C in the polar coordinate manner, respectively.

The sensor sets may obtain a three-dimensional coordinate A2 of the sensor set A, a three-dimensional coordinate B2 of the sensor set B and a three-dimensional coordinate C2 of the sensor set C (a position of the ultrasonic sensor is usually used as a position of each sensor set) relative to the position of the base station according to data detected by the laser sensor and the ultrasonic sensor. For the specific method for obtaining the three-dimensional coordinates by using the sensor sets, please refer to a Chinese patent application (No. CN201610917518.0). Similarly, if one or more sensor sets in the sensor sets may not obtain the three-dimensional coordinates due to blocking or other reasons, the calculation is performed only by using the sensor set which has obtained the three-dimensional coordinate.

(4) A step of calculating third inertial navigation data: the third inertial navigation data of each sensor set in the second positioning period is calculated.

The inertial navigation processing is performed on the three-dimensional coordinates of the sensor sets A, B and C obtained in step (3) to obtain the third inertial navigation data A2', B2' and C2' of the sensor sets in the second positioning period.

An accelerated velocity and an angular velocity at a point B are obtained by the IMU located in set B (the IMU may also be located at a point A or a point C, which is not limited in the present disclosure), and then an accelerated velocity and an angular velocity of the sensor set A and an accelerated velocity and an angular velocity of the sensor set C are obtained according to the accelerated velocity and the angular velocity of the sensor set B.

The specific method is that: since multiple sensor sets are secured on the rigid body, an angular velocity of any point on the rigid body is equal. For example, an acceleration velocity at point A is the acceleration velocity at point B plus a centrifugal force at point A caused by the angular velocity at point B plus an extra acceleration velocity at point A caused by an angular acceleration velocity at point B. Similarly, an acceleration velocity at point C may be calculated. After obtaining the acceleration velocities and angular velocities of points A, B and C, combining with the three-dimensional coordinates obtained in step (1), data fusion of the inertial navigation is performed to obtain position and posture data A2', B2' and C2' at a higher update frequency (which is higher than a data update frequency of an acoustic-optic sensor). For example, the data update frequency of the acoustic-optic sensor is 60 Hz, and the update frequency after the inertial navigation processing is 120 Hz.

According to the above method, the third inertial navigation data A2', B2' and C2' of each sensor set in a next positioning period (the second positioning period) and inertial navigation results of three independent sets may be obtained. The pose prediction of each sensor may be performed by using the inertial navigation of each sensor set itself, so that the error caused by the laser sensor or the ultrasonic sensor may be reduced.

(5) A step of calculating converted poses of the physical center: the converted poses SA, SB and SC of the physical center are obtained respectively through the third inertial navigation data and the pose relationship between each sensor and the physical center S.

The pose SA is obtained by performing the posture rotation according to the position of the point A plus a position offset between the sensor set A and the physical center S. The pose SB is obtained by performing the posture rotation according to the position of the point B plus a position offset between the sensor set B and the physical center S. The pose SC is obtained by performing the posture rotation according to the position of the point C plus a position offset between the sensor set C and the physical center S.

(6) A step of obtaining a predicted pose of each sensor set: the predicted pose of each sensor set is obtained based on the converted poses of the physical center.

The predicted pose of the physical center is compared with each of the converted poses of the physical center, and one of the converted poses of the physical center which has a minimum error is selected, and based on the one of the converted poses of the physical center which has the minimum error, the predicted pose of each sensor set is calculated. The one of the converted poses of the physical center which has the minimum error is selected by using the inertial navigation data of the pose of the physical center, so as to ensure the pose of the physical center has the minimum error, and by using this result, the error of the inertial navigation of each sensor set is further corrected, and the accumulated error is reduced.

The main disadvantage of using the IMU navigation is that the IMU navigation continuously adds the detected and calculated position results to the original position information, which causes to the accumulation of the errors, including an Abbe error. Although the errors are very small during the measurement, the errors accumulate from one position point to another position point, resulting in the "drift", or the difference between a location considered by the system and an actual location to become larger. In the present disclosure, an error range is controlled by selecting the one of the converted poses of the physical center which has the minimum error, so that such error cannot accumulate in the iteration process.

The pose S2 of the physical center obtained in step (2) is compared with the predicted poses SA, SB and SC of the physical center obtained in steps (3) to (5), and a set having the minimum error in SA, SB and SC is obtained as the pose of the physical center. The comparison method is to compare a difference between each of the converted poses SA, SB and SC of the physical center and the predicted pose S2 of the physical center, where if the absolute value of a difference is the minimum, this set is considered as the set having the minimum error. For example, SB has the minimum error, SB is taken as the pose of the physical center. SB' is obtained after the inertial navigation is performed. A pose Anew of the sensor set A and a pose Cnew of the sensor set C are derived by using SB', and the third inertial navigation data of each sensor set obtained in step (4) is corrected by using Anew and Cnew. For the case where the three-dimensional coordinate cannot be obtained due to blocking or other reasons in step (3), the completion may be performed by using Anew and Cnew.

In the data processing method provided by the present disclosure, the above steps are repeated in each positioning period to obtain the poses of all sensor sets. Specifically, step (1), the pose calculation step, is returned; the poses SA2, SB2 and SC2 of the physical center are obtained according to steps (2) to (5); the inertial navigation is performed on the physical center SB' according to step (6) to obtain the predicted pose S3 of the physical center, and S3 is compared with each of the poses SA2, SB2 and SC2 of the physical center obtained according to steps (3) to (5) in a third positioning period to select one of the poses SA2, SB2 and SC2 of the physical center, which has a minimum error with S3, as the basis for prediction and inertial navigation in a next positioning period, i.e., as the pose of the physical center in a step of obtaining the predicted pose of the physical center in the next positioning period. In the step of obtaining the predicted pose of the physical center in the next positioning period, the inertial navigation is performed based on the pose of the physical center, thereby predicting the pose of the physical center and correcting or completing the pose of each sensor set.

In this way, the process is continuously repeated, and by the inertial navigation updating of the physical center, one of the pose data of the three sensor sets A, B and C, which has the minimum error, is obtained.

According to the data processing method provided by the present disclosure, not only the pose data of a certain sensor set caused by blocking or damage can be completed, but also the error of the pose data of each sensor set can be corrected, avoiding the accumulation of the errors. The reason is that in the present disclosure, the pose prediction of each sensor is performed by using the inertial navigation of each sensor set itself, so that the error caused by the laser sensor or the ultrasonic sensor may be reduced. Moreover, one pose of the physical center which has the minimum error is selected by using the inertial navigation data of the poses of the physical center, so as to ensure the pose of the physical center to have the minimum error, and by using this result, the error of the inertial navigation of each sensor set is further corrected. Therefore, the accumulated error is reduced, and the deficiency of the IMU is overcome.

It is to be noted that the data processing method for multi-sensor fusion, the positioning apparatus and the VR device provided by the present disclosure can be applied not only to a mobile terminal VR, but also to a PC terminal VR or an integrated VR. According to "General Specification for Virtual Reality Head-mounted Display Device" issued on Apr. 6, 2017, the VR head-mounted display device includes an external type, an integrated type and a housing type, which are all applicable to the technical schemes provided by the present disclosure.

Since the number of sensors used in the technical schemes of the present disclosure is small and the calculation method is simple, the volume or the power consumption of the VR device provided by the present disclosure is not increased, and it is not necessary to select a high-performance processor, thus implementing the control of the cost.

The data processing method for multi-sensor fusion, the positioning apparatus and the VR device provided by the present disclosure are described in detail. Any obvious amendments made by those skilled in the art to the present disclosure without departing from the content of the present disclosure constitutes an infringement of the patent right to the present disclosure, and corresponding legal responsibility should be undertaken.

What is claimed is:

1. A data processing method for multi-sensor fusion, comprising:
   a pose calculation step: calculating a pose of a physical center by using data of at least one sensor set in a first positioning period;
   a step of obtaining a predicted pose of the physical center: obtaining the predicted pose of the physical center according to an inertial navigation of the pose of the physical center;
   a step of obtaining a three-dimensional coordinate in a second positioning period: calculating a three-dimensional coordinate pose of each sensor set in the second positioning period;
   a step of calculating third inertial navigation data: calculating, based on the three-dimensional coordinate pose of each sensor set, third inertial navigation data of each sensor set in the second positioning period;
   a step of calculating converted poses of the physical center: obtaining the converted poses of the physical center respectively through the third inertial navigation data of each sensor set and a pose relationship between each sensor set and the physical center; and
   a step of obtaining a predicted pose of each sensor set: obtaining the predicted pose of each sensor set based on the converted poses of the physical center.

2. The data processing method for multi-sensor fusion of claim 1, wherein the pose calculation step comprises:
   step 1: performing an inertial navigation by using the data of the at least one sensor set which has obtained a three-dimensional coordinate, to obtain first inertial navigation data;
   step 2: deriving the pose of the physical center by using the first inertial navigation data; and
   step 3: calculating, by using the derived pose of the physical center, a pose of a sensor set not obtaining a three-dimensional coordinate.

3. The data processing method for multi-sensor fusion of claim 1, further comprising:
   comparing the predicted pose of the physical center with each of the converted poses of the physical center, and selecting one of the converted poses of the physical center, which has a minimum error with the predicted pose of the physical center, as a pose of the physical center in a step of obtaining a predicted pose of the physical center in a next positioning period.

4. The data processing method for multi-sensor fusion of claim 3, further comprising:
   deriving poses of the remaining sensor sets based on the one of the converted poses of the physical center which has the minimum error with the predicted pose of the physical center, and correcting the third inertial navigation data of each sensor set.

5. The data processing method for multi-sensor fusion of claim 1, wherein each sensor set comprises a laser sensor and an ultrasonic sensor;
   wherein the step of obtaining the three-dimensional coordinate in the second positioning period comprises: calculating the three-dimensional coordinate pose of each sensor set by a polar coordinate manner; and
   wherein the step of calculating the third inertial navigation data comprises: performing an inertial navigation processing by using the three-dimensional coordinate pose of each sensor set calculated by the polar coordinate manner, so as to obtain the third inertial navigation data of each sensor set in the second positioning period.

6. The data processing method for multi-sensor fusion of claim 3, wherein each sensor set comprises a laser sensor and an ultrasonic sensor;
   wherein the step of obtaining the three-dimensional coordinate in the second positioning period comprises: calculating the three-dimensional coordinate pose of each sensor set by a polar coordinate manner; and
   wherein the step of calculating the third inertial navigation data comprises: performing an inertial navigation processing by using the three-dimensional coordinate pose of each sensor set calculated by the polar coordinate manner, so as to obtain the third inertial navigation data of each sensor set in the second positioning period.

7. The data processing method for multi-sensor fusion of claim 5, wherein the three-dimensional coordinate pose of each sensor set calculated by the polar coordinate manner is the three-dimensional coordinate pose of each sensor set;
   the third inertial navigation data is obtained by performing an inertial navigation separately based on the three-dimensional coordinate pose of each sensor set.

8. The data processing method for multi-sensor fusion of claim 7, wherein the pose calculation step comprises: calculating the pose of the physical center and a pose of a sensor set not obtaining a three-dimensional coordinate by using the data of the at least one sensor set which has obtained a three-dimensional coordinate.

9. The data processing method for multi-sensor fusion of claim 7, wherein the step of calculating the third inertial navigation data comprises:
   obtaining an accelerated velocity and an angular velocity of a position where an inertial device is located and provided by the inertial device, and obtaining accelerated velocities and angular velocities of the remaining sensor sets according to the accelerated velocity and the angular velocity of the position where the inertial device is located.

10. A positioning apparatus, comprising a rigid body, a processor, a memory, and a plurality of sensor sets and an inertial device secured to the body;
    wherein the positioning apparatus has a physical center; and
    the processor is configured to execute at least one computer program stored in the memory for performing the following steps:
    a pose calculation step: calculating a pose of a physical center by using data of at least one sensor set in a first positioning period;
    a step of obtaining a predicted pose of the physical center: obtaining the predicted pose of the physical center according to an inertial navigation of the pose of the physical center;
    a step of obtaining a three-dimensional coordinate in a second positioning period: calculating a three-dimensional coordinate pose of each sensor set in the second positioning period;
    a step of calculating third inertial navigation data: calculating, based on the three-dimensional coordinate pose of each sensor set, third inertial navigation data of each sensor set in the second positioning period;
    a step of calculating converted poses of the physical center: obtaining the converted poses of the physical center respectively through the third inertial navigation data of each sensor set and a pose relationship between each sensor set and the physical center; and
    a step of obtaining a predicted pose of each sensor set: obtaining the predicted pose of each sensor set based on the converted poses of the physical center.

11. The positioning apparatus of claim 10, wherein the processor is further configured to execute at least one computer program stored in the memory for performing the following steps:
- step 1: performing an inertial navigation by using the data of the at least one sensor set which has obtained a three-dimensional coordinate, to obtain first inertial navigation data;
- step 2: deriving the pose of the physical center by using the first inertial navigation data; and
- step 3: calculating, by using the derived pose of the physical center, a pose of a sensor set not obtaining a three-dimensional coordinate.

12. The positioning apparatus of claim 10, wherein the processor is further configured to execute at least one computer program stored in the memory for performing the following steps:
- comparing the predicted pose of the physical center with each of the converted poses of the physical center, and selecting one of the converted poses of the physical center, which has a minimum error with the predicted pose of the physical center, as a pose of the physical center in a step of obtaining a predicted pose of the physical center in a next positioning period.

13. The positioning apparatus of claim 12, the processor is further configured to execute at least one computer program stored in the memory for performing the following steps:
- deriving poses of the remaining sensor sets based on the one of the converted poses of the physical center which has the minimum error with the predicted pose of the physical center, and correcting the third inertial navigation data of each sensor set.

14. The positioning apparatus of claim 10, wherein each sensor set comprises a laser sensor and an ultrasonic sensor, and the processor is further configured to execute at least one computer program stored in the memory for performing the following steps:
- calculating the three-dimensional coordinate pose of each sensor set by a polar coordinate manner; and
- performing an inertial navigation processing by using the three-dimensional coordinate pose of each sensor set calculated by the polar coordinate manner, so as to obtain the third inertial navigation data of each sensor set in the second positioning period.

15. The positioning apparatus of claim 12, wherein each sensor set comprises a laser sensor and an ultrasonic sensor, and the processor is further configured to execute at least one computer program stored in the memory for performing the following steps:
- calculating the three-dimensional coordinate pose of each sensor set by a polar coordinate manner; and
- performing an inertial navigation processing by using the three-dimensional coordinate pose of each sensor set calculated by the polar coordinate manner, so as to obtain the third inertial navigation data of each sensor set in the second positioning period.

16. A virtual reality device, comprising a positioning apparatus and an imaging apparatus,
- wherein the positioning apparatus is mounted on a housing of a head-mounted display device, wherein
- the positioning apparatus comprises a rigid body, a processor, a memory, and a plurality of sensor sets and an inertial device secured to the body;
- the positioning apparatus has a physical center; and
- the processor is configured to execute at least one computer program stored in the memory for performing the following steps:
  - a pose calculation step: calculating a pose of a physical center by using data of at least one sensor set in a first positioning period;
  - a step of obtaining a predicted pose of the physical center: obtaining the predicted pose of the physical center according to an inertial navigation of the pose of the physical center;
  - a step of obtaining a three-dimensional coordinate in a second positioning period: calculating a three-dimensional coordinate pose of each sensor set in the second positioning period;
  - a step of calculating third inertial navigation data: calculating, based on the three-dimensional coordinate pose of each sensor set, third inertial navigation data of each sensor set in the second positioning period;
  - a step of calculating converted poses of the physical center: obtaining the converted poses of the physical center respectively through the third inertial navigation data of each sensor set and a pose relationship between each sensor set and the physical center; and
  - a step of obtaining a predicted pose of each sensor set: obtaining the predicted pose of each sensor set based on the converted poses of the physical center.

17. The virtual reality device of claim 16, wherein the processor is further configured to execute at least one computer program stored in the memory for performing the following steps:
- step 1: performing an inertial navigation by using the data of the at least one sensor set which has obtained a three-dimensional coordinate, to obtain first inertial navigation data;
- step 2: deriving the pose of the physical center by using the first inertial navigation data; and
- step 3: calculating, by using the derived pose of the physical center, a pose of a sensor set not obtaining a three-dimensional coordinate.

18. The virtual reality device of claim 16, wherein the processor is further configured to execute at least one computer program stored in the memory for performing the following steps:
- comparing the predicted pose of the physical center with each of the converted poses of the physical center, and selecting one of the converted poses of the physical center, which has a minimum error with the predicted pose of the physical center, as a pose of the physical center in a step of obtaining a predicted pose of the physical center in a next positioning period.

19. The virtual reality device of claim 18, wherein the processor is further configured to execute at least one computer program stored in the memory for performing the following steps:
- deriving poses of the remaining sensor sets based on the one of the converted poses of the physical center which has the minimum error with the predicted pose of the physical center, and correcting the third inertial navigation data of each sensor set.

20. The virtual reality device of claim 16, wherein each sensor set comprises a laser sensor and an ultrasonic sensor, and the processor is further configured to execute at least one computer program stored in the memory for performing the following steps:
- calculating the three-dimensional coordinate pose of each sensor set by a polar coordinate manner; and performing an inertial navigation processing by using the three-dimensional coordinate pose of each sensor set calculated by the polar coordinate manner, so as to obtain the third inertial navigation data of each sensor set in the second positioning period.

\* \* \* \* \*